(12) United States Patent
Li

(10) Patent No.: US 9,264,439 B2
(45) Date of Patent: Feb. 16, 2016

(54) SYSTEMS AND METHODS TO GENERATE, PRESERVE, COLLECT, SEARCH, AND CERTIFY AUTHENTIC ORIGINAL DOCUMENTS

(76) Inventor: De Xiong Li, Sunnyvale, CA (US)

( * ) Notice: Subject to any disclaimer, the term of this patent is extended or adjusted under 35 U.S.C. 154(b) by 0 days.

(21) Appl. No.: 13/065,310

(22) Filed: Mar. 18, 2011

(65) Prior Publication Data

US 2011/0231663 A1    Sep. 22, 2011

(51) Int. Cl.
  *H04L 9/32*       (2006.01)
  *G06F 21/00*      (2013.01)
  *H04L 29/06*      (2006.01)
  *G06F 21/64*      (2013.01)
  *H04W 12/06*      (2009.01)

(52) U.S. Cl.
  CPC .............. *H04L 63/126* (2013.01); *G06F 21/64* (2013.01); *H04W 12/06* (2013.01); *G06F 2221/2129* (2013.01)

(58) Field of Classification Search
  CPC ....... H04W 12/06; G06F 21/64; H04L 63/126
  USPC .............. 713/176; 380/30, 200, 207; 707/687
  See application file for complete search history.

(56) References Cited

U.S. PATENT DOCUMENTS

| | | | |
|---|---|---|---|
| 6,968,058 B1 * | 11/2005 | Kondoh et al. | 380/200 |
| 7,930,276 B2 * | 4/2011 | Hayashi | 707/687 |
| 7,984,300 B2 * | 7/2011 | Fredlund et al. | 713/176 |

* cited by examiner

*Primary Examiner* — Saleh Najjar
*Assistant Examiner* — Oleg Korsak
(74) *Attorney, Agent, or Firm* — Bo-In Lin

(57) ABSTRACT

The data-content authentication center includes a data-content receiver comprises a transceiver for receiving data/content directly from a data/content generation/capturing device by first checking and confirming a registered device identification (ID) of the data/content generation/capturing device before receiving the data/content transmitted from the data/content generation/capturing device into the data-content receiver.

20 Claims, 3 Drawing Sheets

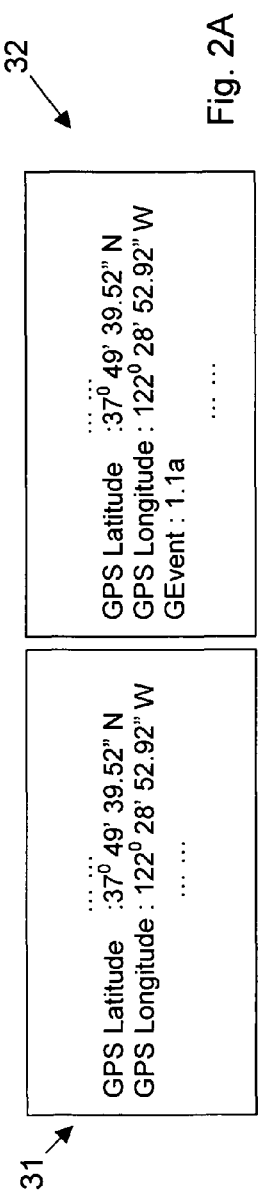
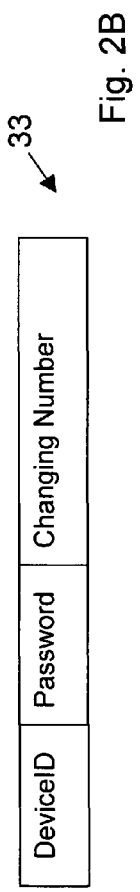
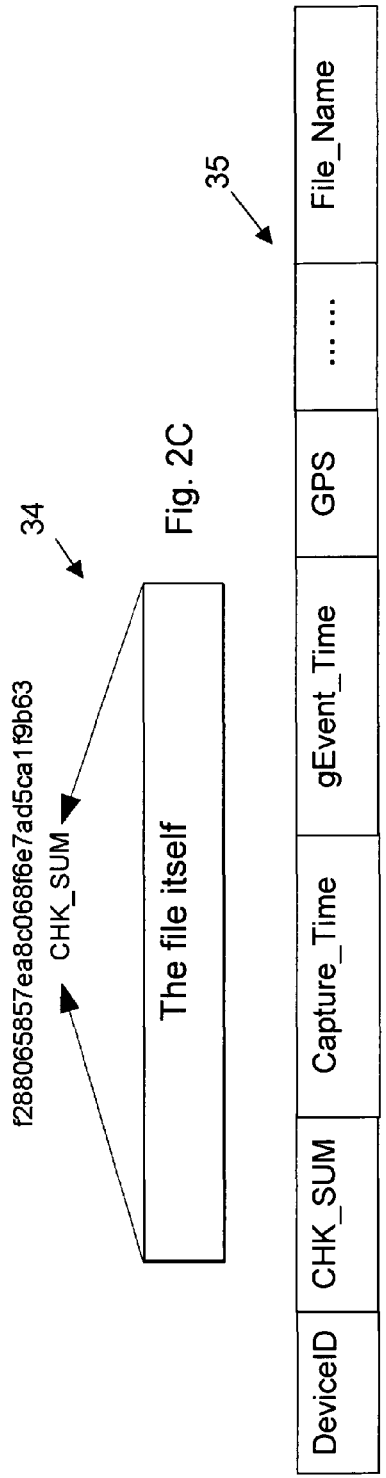

SYSTEMS AND METHODS TO GENERATE, PRESERVE, COLLECT, SEARCH, AND CERTIFY AUTHENTIC ORIGINAL DOCUMENTS

BACKGROUND OF THE INVENTION

1. Field of the Invention

This invention relates generally to systems and methods for authenticating the originality of a document. More particularly, this invention relates to the systems and methods to generate, preserve, collect, search, and to certify the authentic originality of the documents.

2. Description of the Related Art

Even though there are tremendous progress made in the data and media content generation, storage, search, transmission and presentation technologies, there is difficulties and limitations for a network user searches and retrieves these data of media contents to authenticate the originality of the data or content received from the networks. Specifically, there are multiple ways and technologies to modify and change the data or media contents transmitted over the networks. A regular network user has no way to distinguish or verify any of the files or documents are true original.

As more and more business activities are carried out online, there are urgent needs to provide a system and method such that a network user can conveniently and securely validate a document, file or media content received from the network is indeed a true original document. Different techniques and methods are attempted to achieve this purpose including electronic signature system and other methods. However, the state of art techniques are still confronted with various kinds of difficulties and limitations.

In a published US Patent Application 2003/0159045, Nishimoto, et al. discloses original creating apparatus and an originality guaranteeing apparatus to prevent a document and a signature from being falsified while visually displaying the signature, etc. The time data (t1) is added to data of a document (development plan document) and data of a seal column of a creator, an electronic signature is put, and a checksum (CS1) is generated. Then, an original file including also the checksum (CS1) is created, and transmitted to an approver side. The approver side verifies the checksum (CS1), makes a comparison between the checksum (CS1) obtained as a result of the verification, and the checksum recorded to the file, and whether or not both of the checksums match is determined, so that the originality is confirmed. With such a configuration, the authentication process for preventing document falsification can be achieved, whereby a document transfer can be visually made while guaranteeing the originality of document data.

Such methods are still limited by the difficulties that the data and media contents have limited availability and accessible only by those involved in the business transactions. As large amount of media data and contents are generated and captured by large number of networked device, a network user would still require a more convenient and accessible data serve to more readily satisfy the needs for authenticating and validating the originality of data or media contents transmitted and available on the networks.

Therefore, a need still exists in the field of computer network to provide new and improved system configuration and methods to overcome such limitations.

SUMMARY OF THE PRESENT INVENTION

It is therefore an aspect of the present invention to provide new and improved system configuration and methods to capture, store, preserve and authenticate the original documents and file including different types of multimedia contents such that the authenticity and the originality of the documents and contents as originally generated or captured can be conveniently and securely validated.

Another aspect of the present invention is to provide new and improved dedicated media file hosting system to perform authentication validation processes to assure true original documents or contents are received and stored and made available for network users to search, download and use the true original data or contents.

Another aspect of the present invention is to provide direct processing functions to the data generation or capturing devices to carry original data content signature process by combining date, time, location, device identification and other relevant data to the generation of the data to compute a checksum or generate other signatures for the data/content available for assure originality of the data/content sent to a data validation center.

Another aspect of the present invention is to provide a data validation center and a third party server with the third party to independently to generate an authorization key such that the validation center can verify the authenticity of the data/content received from a device is indeed a true original document.

Briefly, in an embodiment, the present invention discloses a data-content authentication center. The data-content authentication center includes a data-content receiver that includes a transceiver for receiving content data directly from a content generation/capturing device by first checking and confirming a registered device identification (ID) of the content generation/capturing device before receiving the content data from the content generation/capturing device into the data-content authentication center.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 2A to 2C are data diagram for showing data processed by the data/content generation/capturing device for transmitting to the validation center and FIG. 2D shows a combined data ready to be sent out by the device 110.

DETAILED DESCRIPTION OF THE PREFERRED EMBODIMENT

Figure 1:
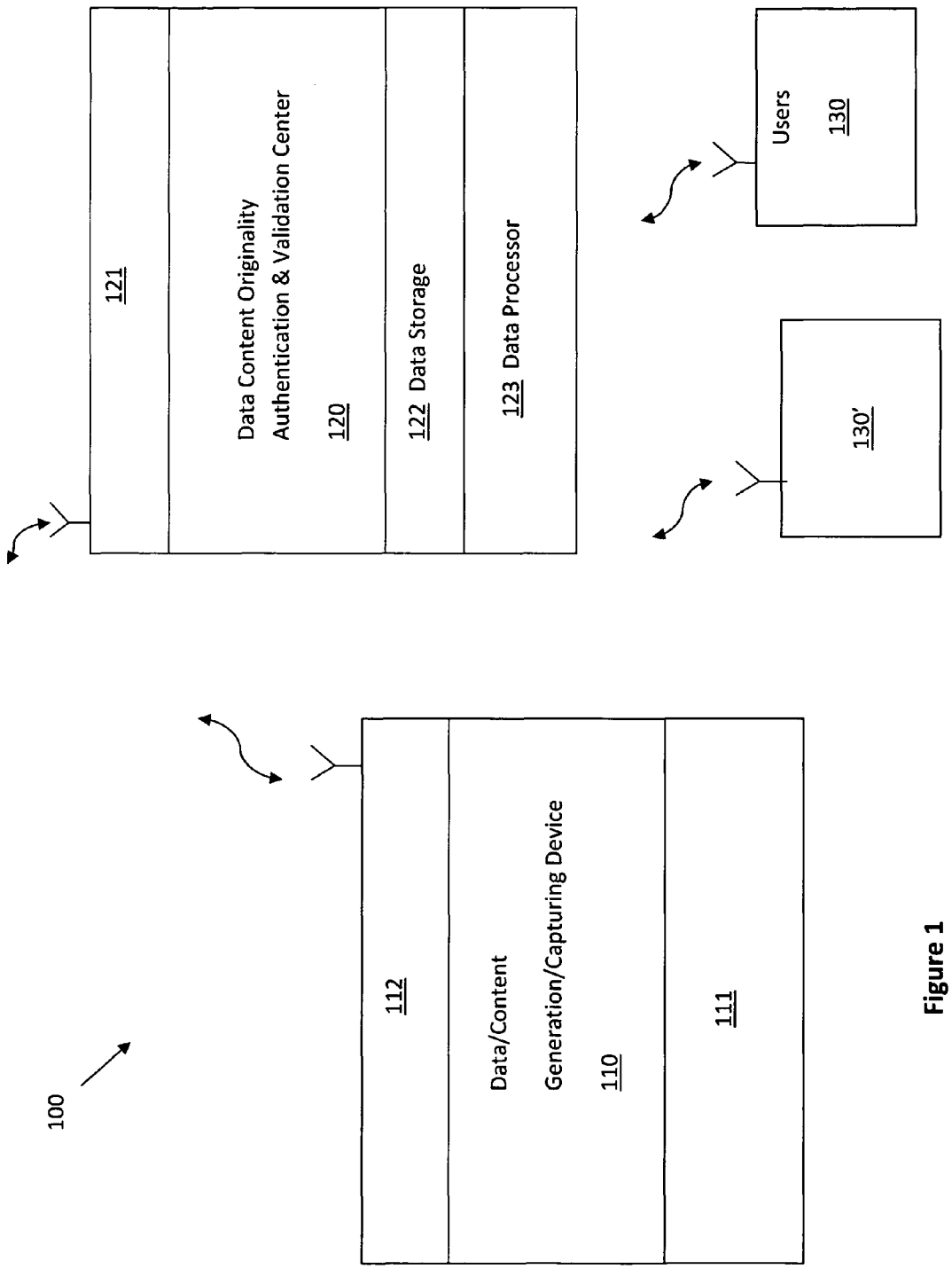
FIG. 1 is a system functional diagram for showing a wireless network communication system includes a data/content generation/capturing device and a data/content originality authentication and validation center of this invention for serving the need of network users.

FIG. 1 is a system functional diagram for showing a wireless communication network system 100 that includes a new and improved data/content generation/capturing device 110 and a data/content originality authentication and validation center 120 of this invention. The wireless communication network system further includes a user 130 for sending a request to the originality validation center 120 to authenticate and validate the originality of a specific data or content. The wireless communication system further includes other users 130' who may also search and requesting an original data/content from the originality validation center 120.

The data/content generation/capturing device 110 may comprise a computer that generates documents in different formats, a scanner that scan images, a digital camera that capture a photographic image, an audio system that generating or recording a song, or any other devices that generates or capture data or multimedia contents. The device 110 may considered as client of the validation center 120 and the device may include networked and non-networked device and their applications. The device may include various hardware or software device or applications such as the mobile phone, PDA, camera/camcorder, recording hardware or software in TVs, Set-top boxes, AV receivers, Media players, Digital piano/keyboard etc., Scanner or Fax machines and their software. The data/content may include data produced by these clients such as GPS based locations, Compass-based directions, and Accelerometer or Three-axis gyro based movements etc.) In general, all hardware or software which can produce data file will be able to use the invention and get the validation for their original true files generated or captured by the device 110.

The device 110 for generating and capturing data/content further includes an original data/content processing function unit 111 that can be implemented as either a hardware, software of firmware functional unit to process the original data or content generated or captured by the device 110. The original data/content process functional unit 111 carries out data/content process functions that may include:

1) Adding date, time and location of the generation or capturing of the original data or content. (For example, the location data is shown in FIG. 2A).
2) Adding device identifications, such as a product model, product serial number and/or other identification number or designations that identify the device 110 for generating and/or capturing the original data or content. (FIG. 2B shows a processed data packet including the user ID as the device ID with password and changing number).
3) Carrying out the compression and/or encryption functions on the data or content. The compression and/or encryption may or may not include the date and time, the location, and the device identifications added to the data and content generated or captured by the device 110.
4) Carrying out an authentication signature process by applying an algorithm to generate a specific authentication signature the may include a checksum of the original data/content or another type of signature for uniquely identifying and validating the originality of the data/content as that generated or captured by the device 110. (FIG. 2C shows a check computation and FIG. 2D shows a combined data ready to be sent out by the device 110).

The device 110 for generating and/or capturing the original data and content further includes a wireless communication functional unit 112. The wireless communication functional unit 112 of the device 110 is used to transmit and receive wireless communication signals. The wireless signal transmitted from the wireless communication functional unit 112 may include the data/content generated and/or captured by the device 110 and processed by the original data/content processing functional unit 111. The processed data/content by the processing functional unit 111 is transmitted through the wireless communication network to the data/content originality authentication and validation center 120.

The data/content originality authentication and validation center 120 includes a wireless network communication functional unit 121 to receive the processed data/content transmitted from the device 110. Before storing the incoming data/content into a data-storage 122, the validation center 120 further includes a data processor 123 to first carrying out incoming data processes that includes:

1) Check a device ID of the device 110 to make sure the data/content is sent from a trustworthy device that is pre-registered and confirmed as a trustworthy data/content generation and/capturing device.
2) Based on the device ID, applying a specific pre-designated keys and/or algorithms to decrypt and/or decompress the incoming data received from a verified device 110.
3) Store the data/content into a data-storage 122.
4) Receiving a request from a user 130 through the network communication network for verification and validation the originality of a data/content transmitted by the user to the validation center 120 and carrying out an originality authentication process to validate the originality of the data or content received form the user.
5) Receiving a request from a user 130 through the network communication network to search, find and transmit a validated and authenticated original data or content to the requestor. Such requestor 130 may transmit specific keys or algorithms to encrypt and/or compress the original data or content in order to transmit the original data/content securely to the requestor.

According to above descriptions and drawings, this invention discloses a wireless communication network system comprising a data-content authentication center. The data-content authentication center includes a wireless transceiver for receiving data/content directly transmitted from a data/content generation/capturing device wherein the data-content authentication center first checks and confirms a registered device identification (ID) of the data/content generation/capturing device before receiving the data/content transmitted from the data/content generation/capturing device into a data storage of the data-content authentication center. In an embodiment, the data/content generation/capturing device further includes an original data/content processing function unit for combining the device identification with date/time and location data into a data/content generated or captured by the data/content generation/capturing device. In another embodiment, the data/content generation/capturing device further includes an original data/content processing function unit for compressing and/or encrypting the data/content generated or captured by the data/content generation/capturing device. In another embodiment, the data/content generation/capturing device further includes an original data/content processing function unit for applying an algorithm to generate a specific authentication signature for the data/content generated or captured by the data/content generation/capturing device. In another embodiment, the data/content generation/capturing device further includes an original data/content processing function unit for applying an algorithm to generate a specific authentication signature comprising a checksum of the data/content generated or captured by the data/content generation/capturing device. In another embodiment, the data/content generation/capturing device further includes either a hardware, software or firmware functional unit to generate or capture an original data/content ready to be processed and transmitted to the data-content authentication center. In another embodiment, the data-content authentication center further includes a data processor to apply a specific pre-designated keys and/or algorithms to decrypt and/or decompress the data/content received from the data/content generation/capturing device. In another embodiment, the data-content authentication center further includes a data processor to receive a request from a user through the wireless communication network system for verification and validation of an originality of a data/content transmitted by the user to the validation center, and carrying out an originality authentication process to validate the originality of the data or content received form the user. In another embodiment, the data-content authentication center further includes a data processor to receive a request from a user through the wireless communication network system to search, find and transmit a validated and authenticated original data or content to the requestor. In another embodiment, the data-content authentication center further includes a data processor to receive specific keys or algorithms to encrypt and/or compress the original data or content in order to securely transmit the original data/content, as requested by the user and found in the data-content authentication center, to the requestor. In another embodiment, the data/content generation/capturing device further comprises a multimedia content capturing device. In another embodiment, the data/content generation/capturing device further comprises a multimedia content generation device. In another embodiment, the data/content generation/capturing device further comprises a document generation device. In another embodiment, the data/content generation/capturing device further comprises a document capturing device.

Figure 3:
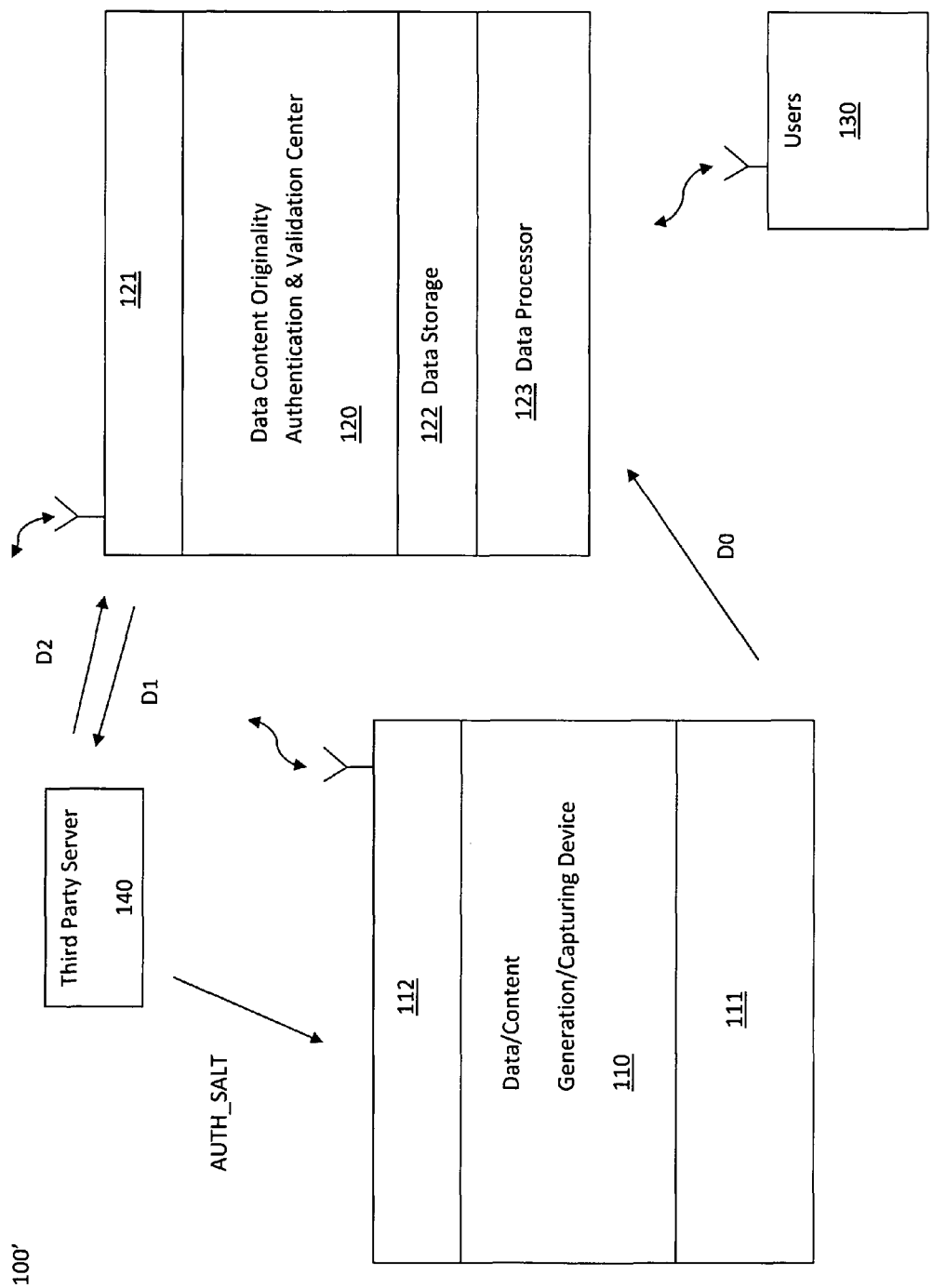
FIG. 3 is a system functional diagram for showing another wireless network communication system that further includes a third party server to provide additional authorization key for assuring the authenticity of the original data/content transmitted from the data/content generation or capturing device to the validation center of this invention.

FIG. 3 is another system functional diagram for showing a wireless communication network system 100' that is similar to the wireless communication network system 100 except that this network system 100' further includes a third party server 140 that performs additional functions to assure further security in validating the authentication of the original data/content stored and transmitted to the validation center 120. The third party server may be implemented by a device manufacturer such as Canon, or Sony as digital camera manufacturer or HP, Dell or Fujitsu as scanner or printer manufacturers. The third party server 140 sends an updated authorization key to the device 110. The device 110 carries out a byte-by byte process, i, e, digests, a security key (SECURE_SALT) with the data generated or captured and the authorization key (AUTH_SALT) to generate a first set of data D0. Then the first set of data D0 is sent to the validation center 120. The validation center 120 digests the SECURE_SALT with the data and sends the result D1 to the third party server 140. Then, the third party server 140 digests the set of data D1 with AUTH_SALT and sends the result D2 to the validation center 120. The validation center 120 then compares and determines if D1 and D2 are identical. If D2 and D0 are identical then the data/content sent to the validation center by the device 110 is a true original data/content generated and/or captured by the device 110. Conversely, if D2 and D0 are different, then the data/content sent by the device 110 is not the original data/content and would not be stored in the data storage in the originality validation center 120. The authorization key, i.e., AUTH_SALT, generated and processed by the third party server 140 may be applied specifically for a particular device and the validation center 120 does not require to process or have access or knowledge of this authorization key. Therefore, additional guarantee is provided to assure the authentication of the originality of the data/content sent by the device 110 to the validation center 120.

According to above descriptions and FIG. 3, this invention discloses a wireless communication network system comprising a data-content authentication center. The data-content authentication center includes a wireless transceiver for receiving data/content directly transmitted from a data/content generation/capturing device; and the data-content authentication center and the data/content generation/capturing device further communicate with a third party to authenticate a data/content sent from the data/content generation/capturing device to the data-content authentication center. In another embodiment, the data/content generation/capturing device further includes an original data/content processing function unit for digesting an authentication key (AUTH_SALT) received from the third party server with data/content generated or captured by the device with a security key (SECURE_SALT) for sending first digested data to the data-content authentication center. In another embodiment, the data-content authentication center further digests the security key (SECURE_SALT) with the data/content received from the data/content generation/capturing device to generate a second digested data for transmitting to the third party server. In another embodiment, the third party server digests the second digested data received from the data-content authentication center with the authentication key (AUTH_SALT) to generate a third digested data for transmitting to the data-content authentication center and the data-content authentication center matches the first digested data with the third digested data to confirm or disapprove the authenticity of the data/content received from the data/content generation/capturing device. In another embodiment, the data-content authentication center further includes a data processor to receive a request from a user through the wireless communication network system for verification and validation of an originality of a data/content transmitted by the user to the validation center, and carrying out an originality authentication process to validate the originality of the data or content received form the user. In another embodiment, the data-content authentication center further includes a data processor to receive a request from a user through the wireless communication network system to search, find and transmit a validated and authenticated original data or content to the requestor.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention. Those approaches and mechanisms in the art will appreciate variations of the above-described embodiments that fall within the scope of the invention. As a result, the invention is not limited to the specific examples and illustrations discussed above, but only the following claims and their equivalents.

I claim:

1. A wireless communication network system comprising a data-content authentication center wherein:

the data-content authentication center includes a wireless transceiver for receiving data/content from a data/content generating/capturing device to verify whether the data/content are originally captured or generated by the data/content generating/capturing device;

a third party server issuing a device specific authorization key to the data/content generating/capturing device wherein the data/content generating/capturing device uses the device specific authorization key to process the data/content to generate an authorized data/content followed by transmitting the authorized data/content and the data/contend to the data-content authentication center; and the data-content authorization center then sends the authorized data/content to the third party server holding the device specific authorization key to process the authorized data/content received from the data/content generating/capturing device to generate a third-party verified and authorized data/content and send the third-party verified and authorized data/content back to the data-content authorization center wherein the data-content authorization center compares the third-party verified and authorized data/content with the data/content received from the data/content generating/capturing device to authenticate whether the data/content are generated or captured originally by the data/content generating/capturing device and to generate an authenticated data/content after verifying that the data/content is originally captured or generated by the data/content capturing/generating device.

2. The wireless communication network system of claim 1 wherein:
the data-content generating/capturing device further applying a security key and the authorization key to process the data/content to generate a first data set $D_0$ and transmitting the first data set $D_0$ to the data-content authentication center wherein the data-content authentication center further applies the security key to process the first data set D0 received from the data/content generating/capturing device to generate a second data set D1 for transmitting the second data set D1 to the third party server for the third party server to process the second data set D1 with the authorization key to generate a third data set D2; and
the third party server further transmits the third data set D2 to the data verification center for comparing the first data set D0 with the third data set D2 to verify whether D2=D0 thus authenticates whether the data/content are generated or captured originally by the data/content generating/capturing device.

3. The wireless communication network system of claim 1 wherein:
the data-content authentication center further receives and processes the data/content sent from the data/content generating/capturing device as a compressed or encrypted data/content.

4. The wireless communication network system of claim 1 wherein:
the data-content authentication center further receives the data/content together with a security key from the data/content capturing/generating device as a device specific authentication signature for the data/content generation/capturing device.

5. The wireless communication network system of claim 1 wherein:
the data-content authentication center further receives the data/content together with a security key from the data/content capturing/generating device wherein the security key comprises a checksum of the data/content as a device specific authentication signature for the data/content generation/capturing device.

6. The wireless communication network system of claim 1 wherein:
the data/content generation/capturing device further generates or captures the data/content comprising multimedia data including audio, video and textual data ready to be processed and transmitted to the data-content authentication center.

7. The wireless communication network system of claim 3 wherein:

the data-content authentication center further includes an authentication data processor to apply a specific pre-designated keys and/or algorithms to decrypt and/or decompress the compressed-or-encrypted data/content received from the data/content generation/capturing device.

8. The wireless communication network system of claim 1 wherein:
the data-content authentication center further includes an authentication data processor to receive a request and a for-authentication data/content from a user through the wireless communication network system for verification and authentication of an originality of the for-authentication data/content by comparing the for-authentication data/content with the authenticated data/content.

9. The wireless communication network system of claim 1 wherein:
the data-content authentication center further includes an authentication data processor to receive a request from a requestor through the wireless communication network system to search, find and transmit the authenticated data/content to the requestor.

10. The wireless communication network system of claim 1 wherein:
the data-content authentication center further includes an authentication data processor to receive specific keys or algorithms to encrypt and/or compress the authenticated data/content in order to securely transmit the authenticated data/content to a requestor.

11. The wireless communication network system of claim 1 wherein:
the data/content generation/capturing device further comprises a multimedia content capturing device.

12. The wireless communication network system of claim 1 wherein:
the data/content generation/capturing device further comprises a multimedia content generation device.

13. The wireless communication network system of claim 1 wherein:
the data/content generation/capturing device further comprises a document generation device.

14. The wireless communication network system of claim 1 wherein:
the data/content generation/capturing device further comprises a document capturing device.

15. The wireless communication network system of claim 1 wherein:
the data-content authentication center further receives date/time and location data as meta-data of the data/content.

16. The wireless communication network system of claim 1 wherein:
the data/content generation/capturing device further comprises a transmitter for transmitting the data/content to the data-content authentication center.

17. The wireless communication network system of claim 1 wherein:
the data/content generation/capturing device generates or captures the data/content of multimedia data including audio, video and textual data.

18. The wireless communication network system of claim 1 wherein:
the data-content authentication center further first processes and applies the device specific authorization key received from the third party server to verify a device ID of the data/content generation/capturing device.

19. The wireless communication network system of claim 1 wherein:

the third party server further comprises a server managed by a device manufacturer of the data/content generation/capturing device.

20. The wireless communication network system of claim 1 wherein:

the data-content authentication center further first processes and applies the device specific authorization key received from the third party server to verify a device ID of the data/content generation/capturing device and applies a specific designated key associated with the device ID to decrypt the data/content received from the data/content capturing/generating device.

* * * * *